(12) United States Patent
Bean et al.

(10) Patent No.: US 12,045,590 B2
(45) Date of Patent: Jul. 23, 2024

(54) LAZY EVALUATION OF SUPPLY CHAIN POLICY BASED ON TRANSPARENCY LOG ATTESTATIONS

(71) Applicant: Red Hat, Inc., Raleigh, NC (US)

(72) Inventors: Ralph Judy Bean, New York, NY (US); Simon Cobden Baird, Boston, MA (US); Zoran Regvart, Grasbrunn (DE); Cuiping Huo, Westford, MA (US); Joseph James Stuart, St. Paul, MN (US); Christophe Giuseppe Augello, Antwerp (BE); Brandon Caton, Pompton Lakes, NJ (US); Luiz Renato Ferreira Carvalho, Westford, MA (US); Robert Garland Nester, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 64 days.

(21) Appl. No.: 18/058,035

(22) Filed: Nov. 22, 2022

(65) Prior Publication Data

US 2024/0168739 A1 May 23, 2024

(51) Int. Cl.
*G06F 8/61* (2018.01)
*G06F 8/41* (2018.01)
*G06F 8/65* (2018.01)

(52) U.S. Cl.
CPC .............. *G06F 8/4452* (2013.01); *G06F 8/63* (2013.01); *G06F 8/65* (2013.01)

(58) Field of Classification Search
None
See application file for complete search history.

(56) References Cited

U.S. PATENT DOCUMENTS

| 10,002,247 | B2 * | 6/2018 | Suarez | G06F 21/31 |
| 11,328,065 | B1 * | 5/2022 | Wall | G06F 21/51 |
| 11,403,136 | B1 * | 8/2022 | Willson | G06F 9/5027 |
| 11,693,651 | B1 * | 7/2023 | Balber | G06F 9/542 |
| | | | | 717/120 |

OTHER PUBLICATIONS

Bugwadia et al., "Protect the pipe! Secure CI/CD pipelines with a police-based approach using Tekton and Kyverno", Cloud Native Computing Foundation, Sep. 14, 2022, 10 pp total.

(Continued)

*Primary Examiner* — Marina Lee
(74) *Attorney, Agent, or Firm* — Womble Bond Dickinson (US) LLP

(57) ABSTRACT

A system, method, and computer readable medium receive a container image and an attestation log. The container image is built from a build pipeline and the attestation log includes information corresponding to tasks utilized by the build pipeline to build the container image. The system, method, and computer readable medium compare the information in the attestation log with policies that includes build pipeline requirements. The system, method, and computer readable medium release the container image to a destination based on the comparison indicating that tasks utilized by the build pipeline to build the container image meet the build pipeline requirements.

20 Claims, 9 Drawing Sheets

(56) References Cited

OTHER PUBLICATIONS

Kovan, Gerry, "A Zero Trust Approach for Securing the Supply Chain of Microservices Packaged as Container Images", Medium, Sep. 7, 2021, 9 pp total.
Heinz, Martin, "Sigstore: A Solution to Software Supply Chain Security", Aug. 16, 2021, 5 pp total.
Cloud Architecture Center, "Help secure software supply chains on Google Kubernetes Engine", Google Cloud, Dec. 18, 2018, 9 pp total.
Yelgundhalli et al., "The Secure Software Factory, A reference architecture to securing the software supply chain", CNCF TAG Security, undated, 32 pp total.

* cited by examiner

LAZY EVALUATION OF SUPPLY CHAIN POLICY BASED ON TRANSPARENCY LOG ATTESTATIONS

TECHNICAL FIELD

Aspects of the present disclosure relate to software supply chains, and more particularly, to evaluating software supply chain policies based on transparency log attestations.

BACKGROUND

A software supply chain includes components, libraries, tools, and processes used to develop, build, and publish software artifacts, such as container images. A software factory is a structured approach to software development that uses software supply chains for providing a repeatable, well-defined path to create and update software, which results in a robust, compliant, and more resilient process for delivering applications to production.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
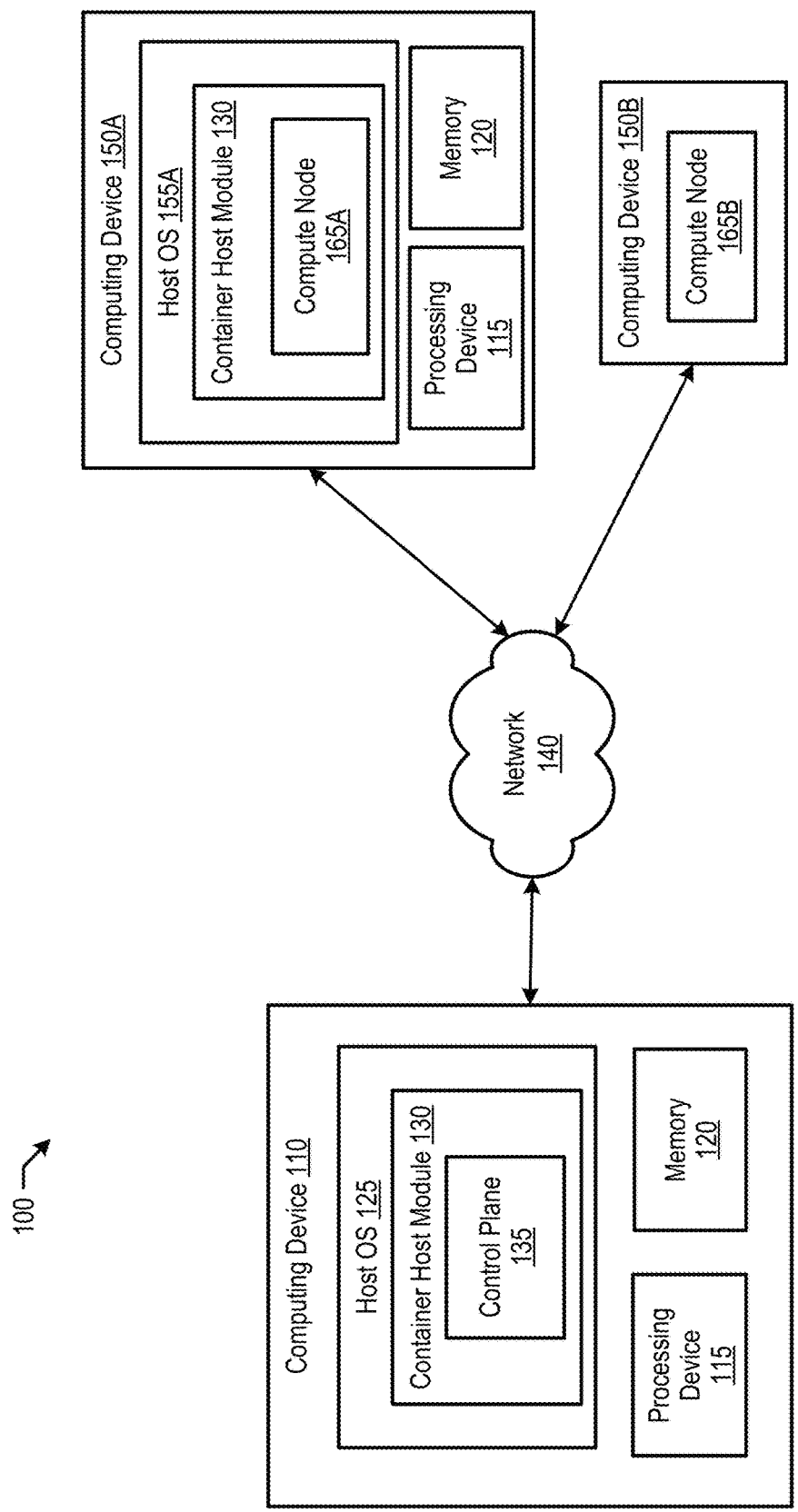
FIG. 1 is a block diagram that illustrates an example system, in accordance with some embodiments of the present disclosure.

Enterprises require assurance that their software build and software supply chain processes meet policy criteria, which is usually accomplished by the enterprise using a software factory that is predetermined and policy-based. The enterprise is then assured that as their software moves through the software factory, the end product has properties that meet the policy criteria. However, conventional software factories are fixed resources in a large enterprise that attempt to support multiple delivery teams with differing needs, schedules, and priorities.

Some delivery teams require customization from the software factory that applies to the business domain of their particular team. As such, the software factory support team either has to implement and maintain a custom path for the particular delivery team, adding cognitive load and special complexity to the system, increasing maintenance costs over time, etc., or the custom path is not implemented and the delivery team loses the opportunity. The delivery team may work around the software factory and implement custom integrations in some tooling of their own, but the enterprise as a whole has decreased surety of policy compliance with the custom integrations.

Some delivery teams are tolerant of adopting new technologies while other delivery teams are not tolerant. The software factory support team may wish to experiment with a new way of interfacing with the build pipeline, but is caught between supporting users with different tolerances for change, thereby limiting opportunities for the enterprise as a whole to advance digital transformation goals.

Some delivery teams using software factory have different schedule sensitivities. Upgrades or changes to the software factory scheduled at a particular time may be acceptable for one delivery team, but may fall during critical release window for another delivery team. Unmanaged, this creates unpredictable risk for the enterprise as releases are delayed.

The present disclosure addresses the above-noted and other deficiencies by providing delivery teams flexibility and control of their own build pipelines while instilling a policy enforcement point that requires software artifacts to meet policies prior to releasing the software artifacts. A trusted release pipeline receives a container image and an attestation log. The container image is built from an untrusted build pipeline and the attestation log includes information corresponding to tasks utilized by the untrusted build pipeline to build the container image. The trusted release pipeline compares the information in the attestation log with policies that include build pipeline requirements. In turn, the trusted release pipeline releases the container image to a destination based on the comparison indicating that the tasks utilized by the untrusted build pipeline to build the container image meet the build pipeline requirements.

In some embodiments, the policies include task digests. In some embodiments, the trusted release pipeline verifies that the information in the attestation log matches the task digests in the policies, and releases the container image based on the verification.

In some embodiments, the policies include task definitions and a task signature. In some embodiments, the trusted release pipeline verifies that the information in the attestation log matches the task definitions and the task signature in the policies, and releases the container image based on the verification.

In some embodiments, the container image is a first container image and the attestation log is a first attestation log and, responsive to determining that at least one of the build pipeline requirements are not met, the trusted release pipeline generates feedback that identifies the build pipeline requirements that are not met. The trusted release pipeline then provides the feedback corresponding to the untrusted build pipeline. Responsive to providing the feedback, the trusted release pipeline receives a second container image and a second attestation log. The trusted release pipeline determines that the second attestation log indicates that the second container image meets the build pipeline requirements, and releases the second container image accordingly.

In some embodiments, the build pipeline is an unlocked build pipeline and customizable by a user device. In some embodiments, the attestation log is generated based on observing the untrusted build pipeline while building the container image. In some embodiments, the attestation log is unmodifiable by the user device. In some embodiments, the trusted release pipeline prohibits release of the container image in response to determining that the attestation log is signed with an invalid key.

FIG. 1 is a block diagram that illustrates an example system 100, in accordance with some embodiments of the present disclosure. As illustrated in FIG. 1, system 100 includes a computing device 110, and a plurality of computing devices 150. The computing devices 110 and 150 may be coupled to each other (e.g., may be operatively coupled, communicatively coupled, may communicate data/messages with each other) via network 140. Network 140 may be a public network (e.g., the Internet), a private network (e.g., a local area network (LAN) or wide area network (WAN)), or a combination thereof. In some embodiments, network 140 may include a wired or a wireless infrastructure, which may be provided by one or more wireless communications systems, such as a WiFi' hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 150.

Each computing device 110 and 150 may include hardware such as processing device 115 (e.g., processors, central processing units (CPUs)), memory 120 (e.g., random access memory 120 (e.g., RAM)), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Memory 120 may be configured for long-term storage of data and may retain data between power on/off cycles of the computing device 110. Each computing device may comprise any suitable type of computing device or machine that has a programmable processor including, for example, server computers, desktop computers, laptop computers, tablet computers, smartphones, set-top boxes, etc. In some examples, each of the computing devices 110 and 150 may include a single machine or may include multiple interconnected machines (e.g., multiple servers configured in a cluster). The computing devices 110 and 150 may be implemented by a common entity/organization or may be implemented by different entities/organizations. For example, computing device 110 may be operated by a first company/corporation and one or more computing devices 150 may be operated by a second company/corporation. Each of computing device 110 and computing devices 150 may execute or include an operating system (OS) such as host OS 125 and host OS 155 respectively, as discussed in more detail below. The host OS of a computing device 110 and 150 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 150 may each implement a compute node (e.g., as part of the container orchestration engine).

In some embodiments, a container orchestration engine 130 (referred to herein as container host 130), such as the Redhat™ OpenShift™ module, may execute on the host OS 125 of computing device 110 and the host OS 155 of computing device 150, as discussed in further detail herein. The container host module 130 may be a platform for developing and running containerized applications and may allow applications and the data centers that support them to expand from just a few machines and applications to thousands of machines that serve millions of clients. Container host 130 may provide an image-based deployment module for creating containers and may store one or more image files for creating container instances. Many application instances can be running in containers on a single host without visibility into each other's processes, files, network, and so on. Each container may provide a single function (often called a "micro-service") or component of an application, such as a web server or a database, though containers can be used for arbitrary workloads. In this way, the container host 130 provides a function-based architecture of smaller, decoupled units that work together.

Container host 130 may include a storage driver (not shown), such as OverlayFS, to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host 130 or a registry server. In some embodiments, the image file may include one or more base layers. An image file may be shared by multiple containers. When the container host 130 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each include static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

While the container image is the basic unit containers may be deployed from, the basic units that the container host 130 may work with are called pods. A pod may refer to one or more containers deployed together on a single host, and the smallest compute unit that can be defined, deployed, and managed. Each pod is allocated its own internal IP address, and therefore may own its entire port space. Containers within pods may share their local storage and networking. In some embodiments, pods have a lifecycle in which they are defined, they are assigned to run on a node, and they run until their container(s) exit or they are removed based on their policy and exit code. Although a pod may contain more than one container, the pod is the single unit that a user may deploy, scale, and manage. The control plane 135 of the container host 130 may include replication controllers (not shown) that indicate how many pod replicas are required to run at a time and may be used to automatically scale an application to adapt to its current demand.

By their nature, containerized applications are separated from the operating systems where they run and, by extension, their users. The control plane 135 may expose applications to internal and external networks by defining network policies that control communication with containerized applications (e.g., incoming HTTP or HTTPS requests for services inside the compute node 165).

A typical deployment of the container host 130 may include a control plane 135 and a cluster of compute nodes 165, including compute nodes 165A and 165B (also referred to as compute machines). The control plane 135 may include REST APIs which expose objects as well as controllers which read those APIs, apply changes to objects, and report status or write back to objects. The control plane 135 manages workloads on the compute nodes 165 and also executes services that are required to control the compute nodes 165. For example, the control plane 135 may run an API server that validates and configures the data for pods, services, and replication controllers as well as provides a focal point for the cluster 165's shared state. The control plane 135 may also manage the logical aspects of networking and virtual networks. The control plane 135 may further provide a clustered key-value store (not shown) that stores the cluster 165's shared state. The control plane 135 may also monitor the clustered key-value store for changes to objects such as replication, namespace, and service account controller objects, and then enforce the specified state.

The cluster of compute nodes 165 are where the actual workloads requested by users run and are managed. The compute nodes 165 advertise their capacity and a scheduler (not shown), which is part of the control plane 135, determines which compute nodes 165 containers and pods will be started on. Each compute node 165 includes functionality to accept and fulfill requests for running and stopping container workloads, and a service proxy, which manages communication for pods across compute nodes 165. A compute node 165 may be implemented as a virtual server, logical container, or GPU, for example.

Figure 2:
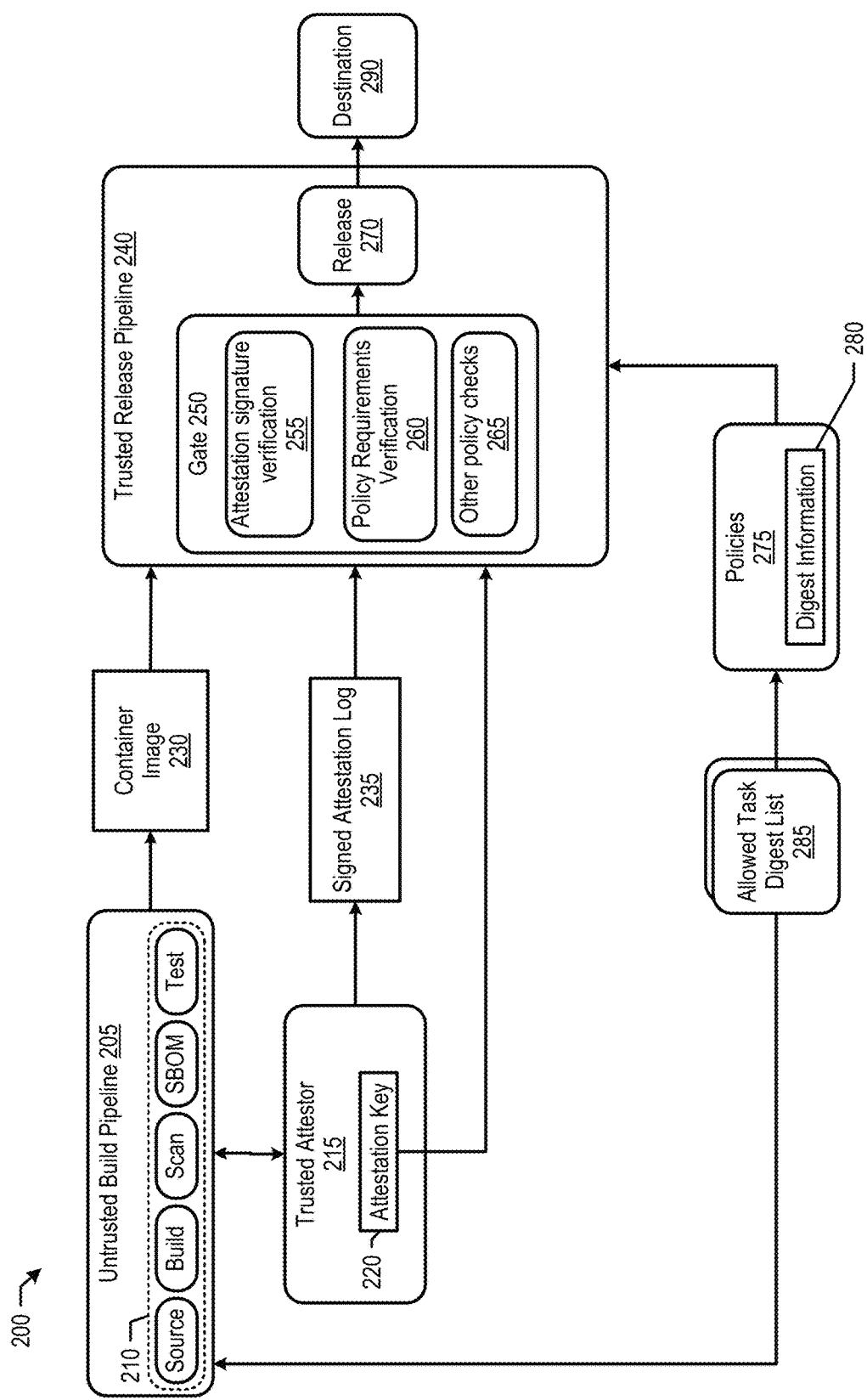
FIG. 2 is a block diagram that illustrates an example system for verifying that a container image meets build requirements using digest information before releasing the container image to a destination, in accordance with some embodiments of the present disclosure.

FIG. 2 is a block diagram that illustrates an example system for verifying that a container image meets build requirements using digest information before releasing the container image to a destination, in accordance with some embodiments of the present disclosure. System 200 enables a user to build container images using an open-ended customizable platform via untrusted build pipeline 205 and ensures that the container image meets build requirements via trusted release pipeline 240 before releasing the container image to a destination 290.

Referring to FIG. 2, in some embodiments an enterprise's software factory refers to well-known pipeline stages (tasks/steps) by their digest to specify build requirements for building a container image, which are included in allowed task digest list 285. System 200 provides allowed task digest list 285 to untrusted build pipeline 205 (via administrator, user, repository, etc.), which informs the user of the tasks required (build requirements) to build a releasable container image. System 200 also includes information pertaining to allowed task digest list 285 in policies 275 (e.g., digest information 280). As discussed below, trusted release pipeline 240 compares digest information 280 with build evidence in signed attestation log 235 to verify whether container image 230 was built using tasks/steps required to meet the build requirements.

Untrusted build pipeline 205 includes several tasks 210, which are customizable by the user, to build container image 230, which is passed to trusted release pipeline 240. In addition, trusted attestor 215 monitors the build process of container image 230 and generates an attestation log describing evidence of the build process. Trusted attestor 215 signs the attestation log using attestation key 220, and passes signed attestation log 235 and attestation key 220 to trusted release pipeline 240.

Trusted release pipeline includes gate 250 and release 270. Gate 250 is a policy enforcement point to ensure that container image 230 meets each of the build requirements included in digest information 280, such as during a controlled release process for container image content (e.g., to a protected container image registry).

Gate 250 (e.g., an evaluator utility) performs attestation signature verification 255, policy requirements verification 260, and other policy checks 265. Gate 250 performs attestation signature verification 255 to ensure that signed attestation log 235 has not been altered by comparing attestation key 220 with signed attestation log 235. If the signatures match then signed attestation log 235 is valid.

Gate 250 performs policy requirements verification 260, which compares the digest information 280 with the evidence in signed attestation log 235 to determine whether container image 230 meets the build requirements. Container image 230 is then considered releasable if signed attestation log 235 identifies pipeline tasks/steps that meet each of the build requirements described in policies 275. For example, the digest information 280 may indicate that tasks A, B, and C are required, but the evidence in signed attestation log 235 indicates that only tasks A and B were completed. In another example, the digest information 280 may indicate that task E should not be performed, and policy requirements verification 260 checks whether task E was performed to build container image 230. In these examples, trusted release pipeline 240 generates a report and provides the report to untrusted build pipeline 205 of the tasks that have not been met or tasks that should not be used. This allows the user to iteratively develop container image 230 using untrusted build pipeline 205 until container image 230 is releasable (see FIG. 7 and corresponding text for further details).

Figure 4:
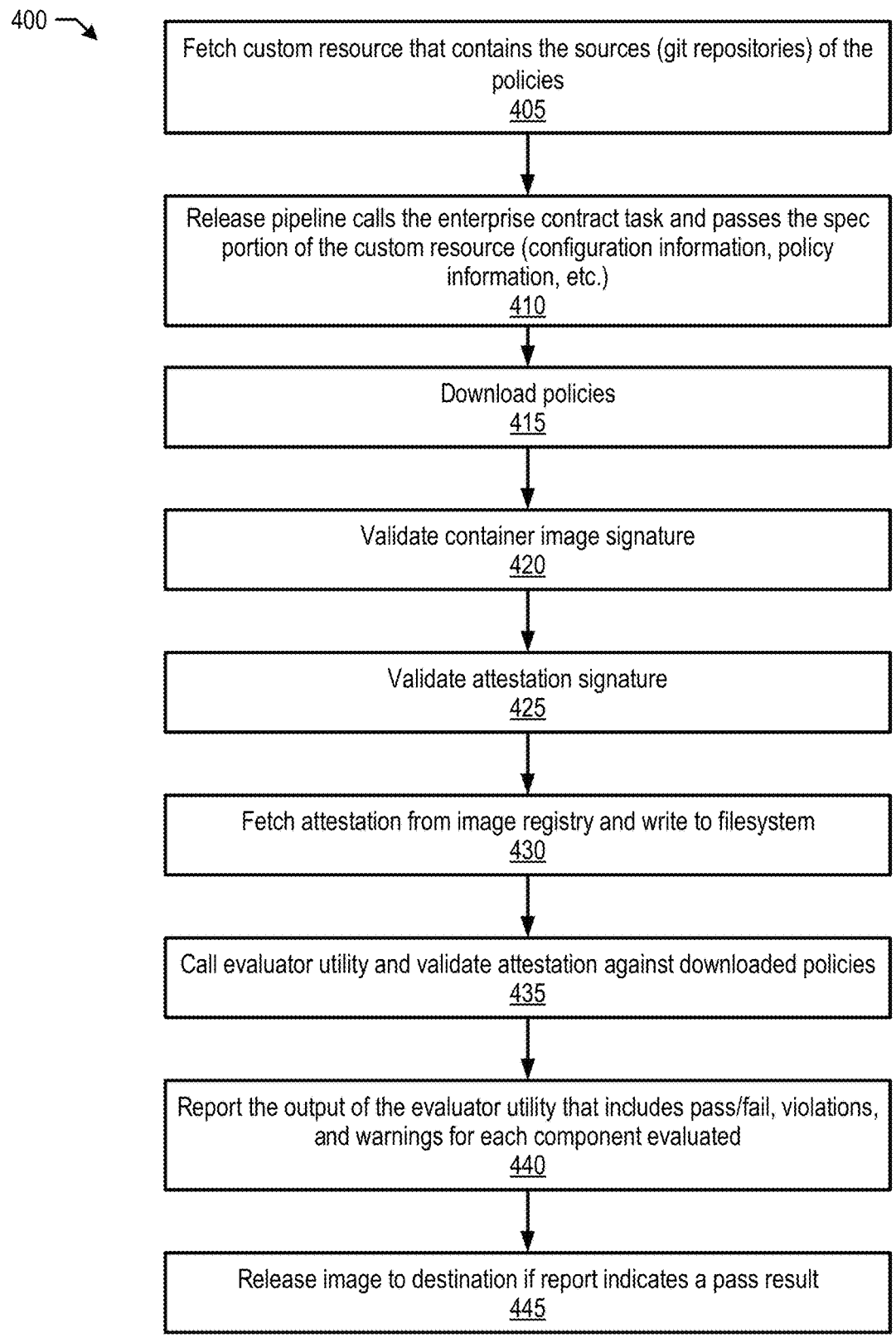
FIG. 4 is a flow diagram of a method of evaluating a container image and attestation log after a build pipeline process and prior to release, in accordance with some embodiments of the present disclosure.

Gate 250 also performs other policy checks 265, such as validating a signature of container image 230 to ensure that container image 230 has not been altered (see FIG. 4 and corresponding text for further details). When container image 230 passes gate 250, trusted release pipeline 240 performs release 270 to release container image 230 to destination 290, such as a repository.

Figure 3:
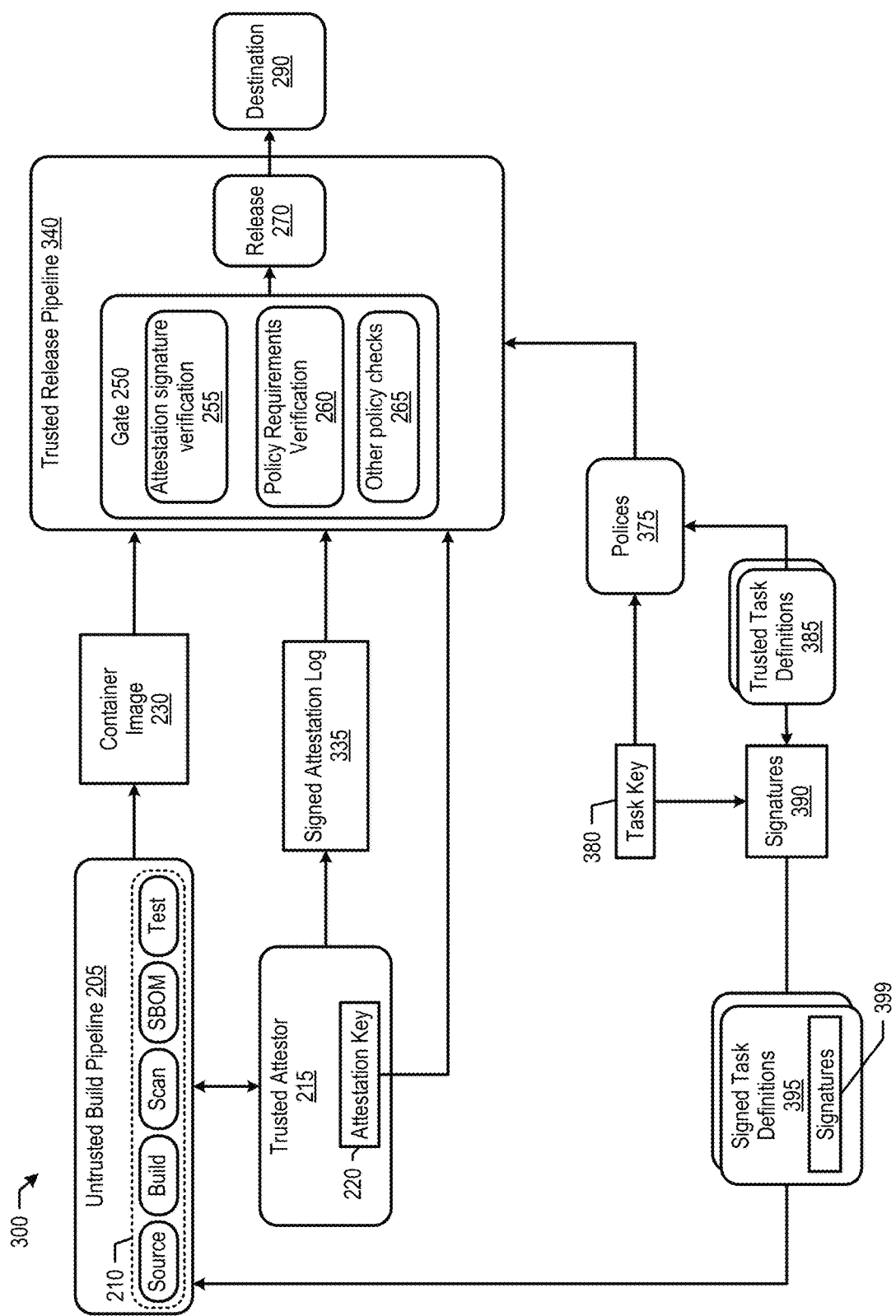
FIG. 3 is a block diagram that illustrates an example system for using task signature information to verify that container images meet build requirements before releasing the container image, in accordance with some embodiments of the present disclosure.

FIG. 3 is a block diagram that illustrates an example system for using task signature information to verify that container images meet build requirements before releasing the container image, in accordance with some embodiments of the present disclosure. System 300 shows an embodiment where task signatures, instead of digests, are utilized to verify that a container image meets build requirements. In some embodiments, Red Hat™ offers a Managed Build Service (MBS) as a part of their App Studio that provides a flexible developer platform to solve enterprise-grade compliance and supply chain issues.

An enterprise's software factory establishes trusted task definitions 385 that specify build requirements for building a container image. The software factory signs the trusted task definitions 385 via task key 380 to produce signed task definitions 395 (includes signatures 399). In addition, the software factory adds information pertaining to trusted task definitions 385 and task key 380 into policies 375. In some embodiments, MBS publishes cryptographically signed tasks to a Tekton™ hub. Tekton™ is a flexible Kubernetes-native open source framework for creating continuous integration and delivery (CI/CD) systems.

In some embodiments, App Studio developers and software production organizations cryptographically sign their task releases and attach their signatures to the task (e.g., via annotations). Cryptographically signing is a mechanism to express identity and also ensure that the tasks are not altered. In some embodiments, the enterprise's software factory team signs their task definitions with an asymmetric signature (pretty good privacy (PGP), GnuPrivacy Guard (GPG), etc.). As discussed below, attestations are then considered valid if they carry a signature which is valid for the pipeline task in the attestation and if the public key of the signature matches one described in policies 375.

Untrusted build pipeline 205 loads the signed task definitions 395, or at least inserts the corresponding signatures 399 into annotations of their corresponding tasks 210. Then, as untrusted build pipeline 205 builds container image 230, the signatures are passed to trusted attestor 215 as evidence of the build process. Trusted attestor 215 generates an attestation log that includes signatures 399, signs the attestation log using attestation key 220, and passes signed attestation log 335 and attestation key 220 to trusted release pipeline 240.

In some embodiments, the MBS leverages Tekton Chains™ for proof of executed tasks in untrusted build pipeline 205. Tekton Chain™ provides a controller (e.g., trusted attestor 215) that watches for TaskRuns, creates a copy of the TaskRuns as they appear, and cryptographically signs them to provide verifiable proof of executed tasks during a PipelineRun. A task specifies one or more steps that execute container images and each container image performs a specific piece of build work. A TaskRun executes the steps in the task in the order they are specified until all steps have executed successfully or a failure occurs. In some embodiments, when a task is instantiated into a TaskRun, the annotations from the task are copied forward as annotations on the TaskRun. In some embodiments, MBS leverages a transparency log for serialization of TaskRun proof. Tekton Chains™ provides a mechanism to automatically upload signed payloads to a transparency log for off-system verification.

Trusted release pipeline includes gate 250 and release 270. Gate 250 is a policy enforcement point to ensure that container image 230 meets each of the build requirements included in digest information 280. Gate 250 (e.g., an evaluator utility) performs attestation signature verification 255, policy requirements verification 260, and other policy checks 265. Gate 250 performs attestation signature verification 255 to ensure that signed attestation log 235 has not been altered by comparing attestation key 220 with signed attestation log 235. If the keys match then signed attestation log 235 is valid.

Gate 250 performs policy requirements verification 260, which compares the task signature information in signed attestation log 335 with signature information in policies 375 to determine whether container image 230 meets the build requirements. Container image 230 is then considered valid if the signed attestation log 235 includes signatures of each of the trusted task definitions 385 described in policies 375. In some embodiments, MBS may utilize Open Policy Agent (OPA) to enforce policies 375 at application run time for user applications and Red Hat™ Managed Services. For example, customer clusters could be configured to deny pulling non-compliant container images. In some embodiments, a GitOps service (another part of App Studio) may prohibit the application of objects to customer clusters that refer to non-compliant images.

Gate 250 performs other policy checks 265, such as validating a signature of container image 230 to ensure that container image 230 has not been altered. When container image 230 passes gate 250, trusted release pipeline 240 performs release 270 to release container image 230 to destination 290, such as a repository.

FIG. 4 is a flow diagram of a method of evaluating a container image and attestation log after a build pipeline process and prior to release, in accordance with some embodiments of the present disclosure. Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by processing device 115 shown in FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

With reference to FIGS. 2, 3, and 4, method 400 begins at block 405, where processing logic fetches a custom resource that includes the sources (e.g., git repositories) of the policies (e.g., policies 275 or 375). At block 410, processing logic (e.g., trusted release pipeline 240) calls an enterprise contract task and passes a specification portion of the custom resource to the enterprise contract task. In some embodiments, the specification portion of the custom resource includes configuration information to setup and configure an evaluator. In some embodiments, the specification portion of the custom resource includes information on what policies to use in the evaluation, where to get the policies (e.g., Git repo, branch) and a public key used to verify the container image 230 signature. At block 415, processing logic downloads the policies (275 or 375, based on the embodiment). At block 420, processing logic validates the container image 230 signature using the public key from the specification portion of the custom resource.

At block 425, processing logic validates the signature of signed attestation log (235 or 335) via attestation signature verification 255. In some embodiments, if the attestation log's signature is not validated, processing logic terminates the evaluation and reports that the attestation log has been compromised. When the attestation log's signature is validated, at block 430, processing logic fetches the attestation log, such as from an image registry, and writes the attestation log to a filesystem. At block 435, processing logic calls an evaluator utility (e.g., Conftest, a utility to write tests against structured configuration data) and validates the attestation log against the downloaded policies (via policy requirements verification 260).

At block 440, processing logic reports the output of the evaluator utility, which includes pass/fail status, violations (e.g., "task C not completed"), and warnings for each component (e.g., policy) evaluated. At block 445, processing logic releases the container image when the status from the evaluator is a pass result. In some embodiments, processing logic sends the report to the user for the user to iteratively modify the untrusted build pipeline 205 and move towards a releasable container image (see FIG. 7 and corresponding text for further details).

Figure 5:
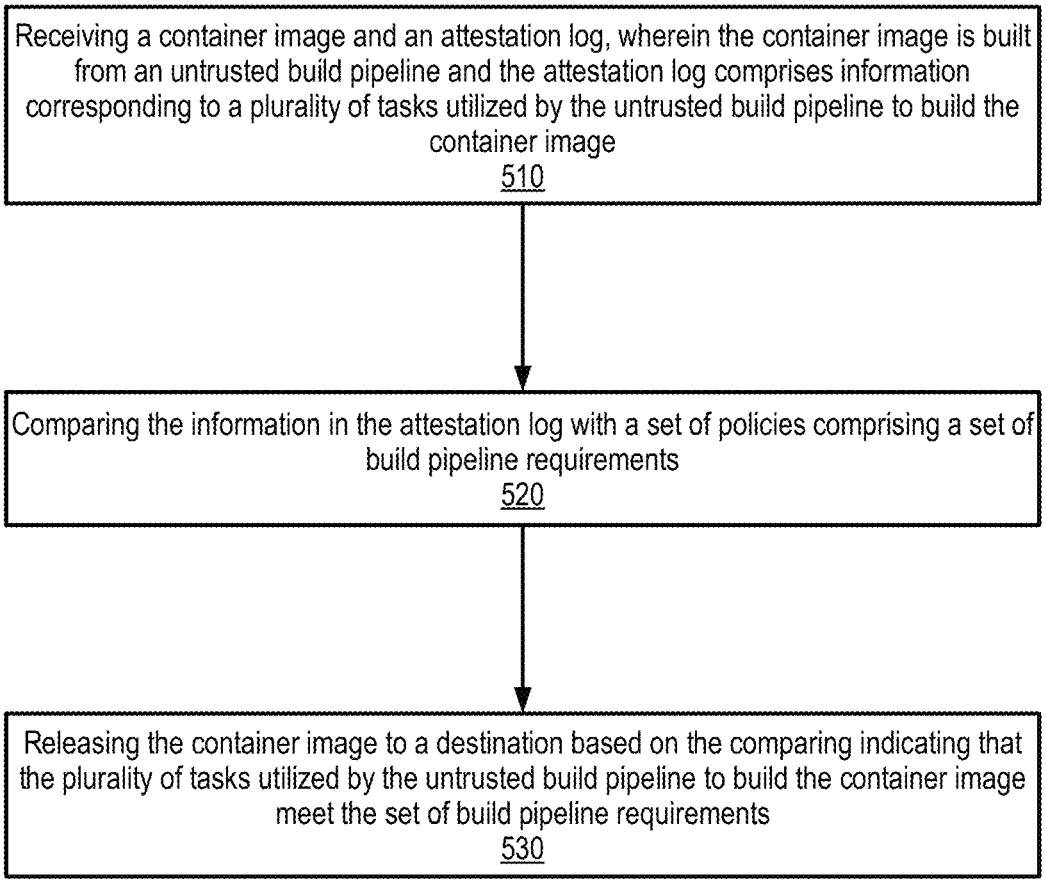
FIG. 5 is a flow diagram of a method of releasing a container image based on evaluating build pipeline evidence utilized to create the container image, in accordance with some embodiments of the present disclosure.

FIG. 5 is a flow diagram of a method of releasing a container image based on evaluating build pipeline evidence utilized to create the container image, in accordance with some embodiments of the present disclosure. Method 500 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by processing device 115 shown in FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

With reference to FIGS. 2 and 5, method 500 begins at block 510, where processing logic receives a container image 230 and a signed attestation log 235. The container image 230 is built from untrusted build pipeline 205 and the signed attestation log 235 includes information corresponding to tasks 210 utilized by the untrusted build pipeline 205 to build the container image 230.

At block 520, processing logic compares the information in the signed attestation log 235 with policies 275 that includes build pipeline requirements (e.g., digest information 280). At block 530, processing logic releases the container image 230 to a destination (e.g., repository) based on the comparison indicating that the tasks 210 utilized by the untrusted build pipeline 205 to build the container image 230 meets the build pipeline requirements (e.g., digest information 280).

Figure 6:
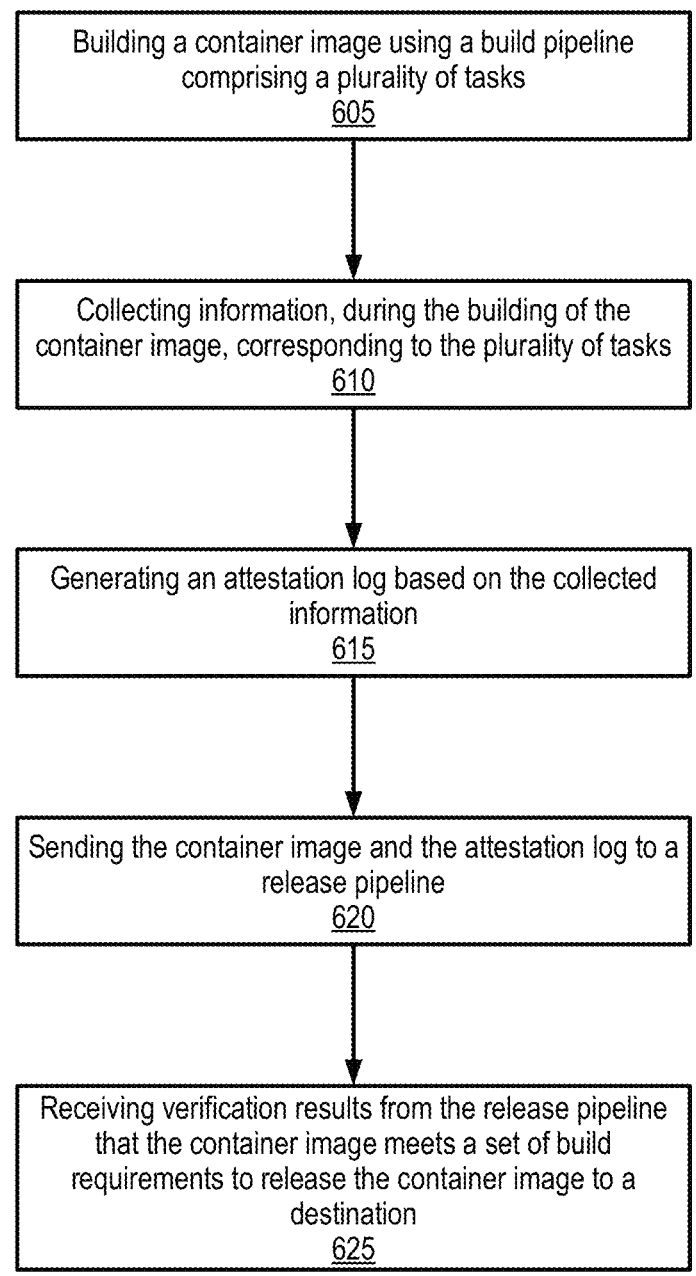
FIG. 6 is a flow diagram of a method of building a container image and attestation log, and sending the container image and attestation log to a release pipeline, in accordance with some embodiments of the present disclosure.

FIG. 6 is a flow diagram of a method of building a container image and attestation log, and sending the container image and attestation log to a release pipeline, in accordance with some embodiments of the present disclosure. Method 600 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by processing device 115 shown in FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

With reference to FIGS. 2 and 6, method 600 begins at block 605, where processing logic builds a container image 230 using an untrusted build pipeline 205 that includes multiple tasks 210. At block 610, processing logic (e.g., trusted attestor 215) collects information during the building of the container image 230 that corresponds to the executed tasks, such as task signatures through annotations or digest information.

At block 615, processing logic generates an attestation log (e.g., signed attestation log 235) based on the collected information. At block 620, processing logic sends the container image 230 and the signed attestation log 235 to trusted release pipeline 240. At block 625, processing logic receives verification results from the trusted release pipeline 240 that the container image meets build requirements (e.g., digest information 280) to release the container image 230 to a destination.

Figure 7:
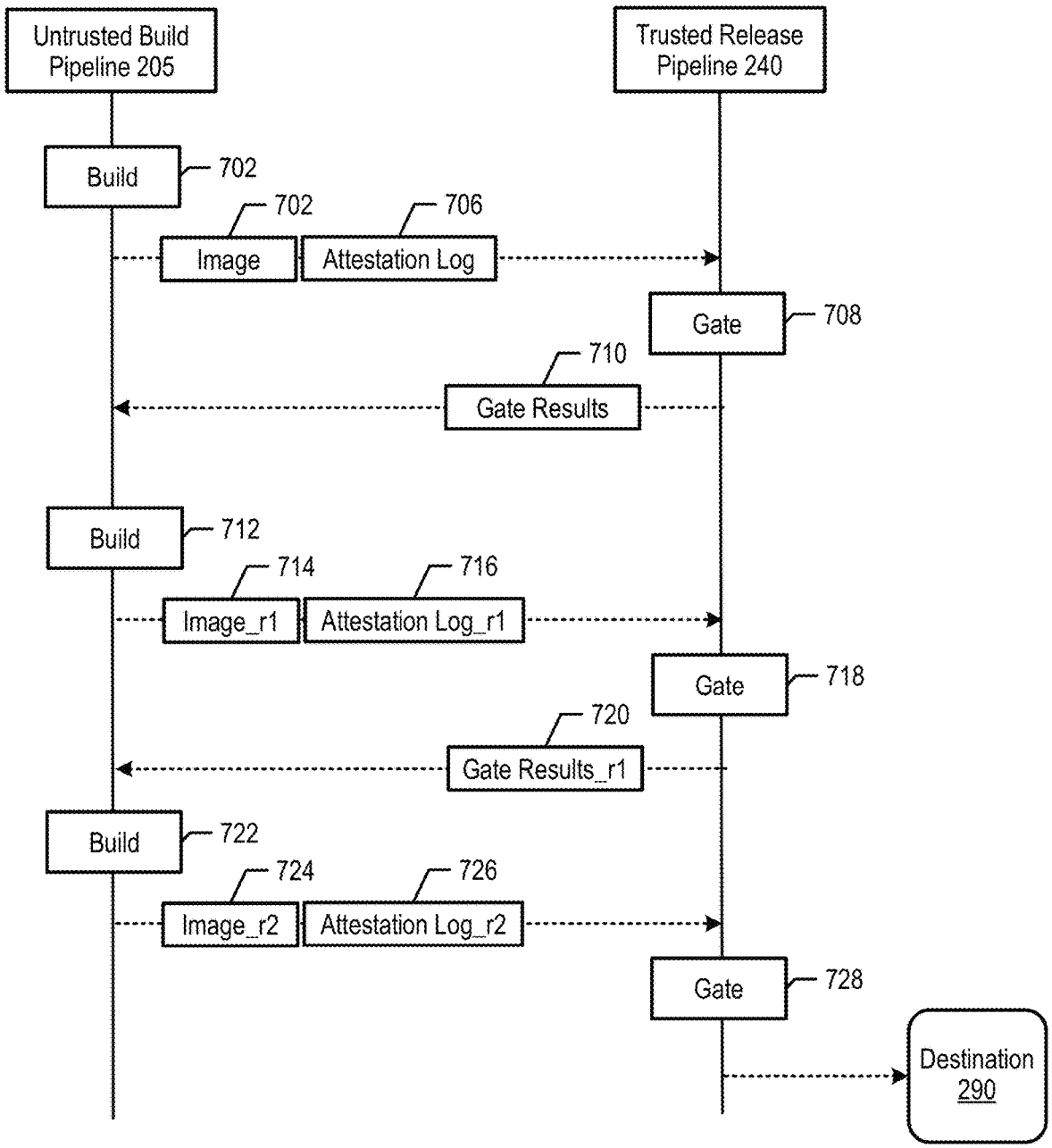
FIG. 7 is a block diagram that illustrates an example flow for iteratively developing a container image that is acceptable for release, in accordance with some embodiments of the present disclosure.

FIG. 7 is a block diagram that illustrates an example flow for iteratively developing a container image that is acceptable for release, in accordance with some embodiments of the present disclosure. A user uses untrusted build pipeline 205 to perform a first build 702 and produce container image 705. Untrusted build pipeline 205 provides container image 705 and trusted attestor 215 provides signed attestation log 706 to trusted release pipeline 240. Trusted release pipeline 240, in turn, performs gate 708 on container image 705 and signed attestation log 706 using embodiments discussed herein. Trusted release pipeline 240 determines, based on evaluating signed attestation log 706 during gate 708, that container image 704 does not meet one or more build requirements. In turn, trusted release pipeline to 240 sends gate result 710 to untrusted build pipeline 205, which informs the user of untrusted build pipeline 205 of the build requirements that are not met. In some embodiments, gate results 710 include solutions to correct issues, such as which tasks to add/remove in the build pipeline 205 and links to locations of the tasks.

The user of untrusted build pipeline 205 adjusts, removes, and/or adds tasks to untrusted build pipeline 205, and untrusted build pipeline 205 performs build 712 to produce container image_r1 714. Untrusted build pipeline 205 provides container image_r1 714 and trusted attestor 215 provides signed attestation log_r1 716 to trusted release pipeline 240. Trusted release pipeline 240 performs gate 718 on container image_r1 714 and attestation log_r1 716, and determines that container image_r1 714 still does not meet one or more of the build requirements. In turn, trusted release pipeline to 240 sends gate results_r1 720 to untrusted build pipeline 205, which informs the user of untrusted build pipeline 205 as to which build requirements are not met.

The user of untrusted build pipeline 205 adjusts, removes, and/or adds tasks to untrusted build pipeline 205, and untrusted build pipeline 205 performs build 722 to generate container image_r2 724. Untrusted build pipeline 205 provides container image_r2 724 and trusted attestor 215 provides attestation log_r2 726 to trusted release pipeline 240. Trusted release pipeline 240 performs gate 728 on container image_r2 724 and attestation log_r2 726, and determines that container image_r2 724 now meets all of the build requirements. As such, trusted release pipeline 240 releases container image_r2 724 to destination 290.

Figure 8:
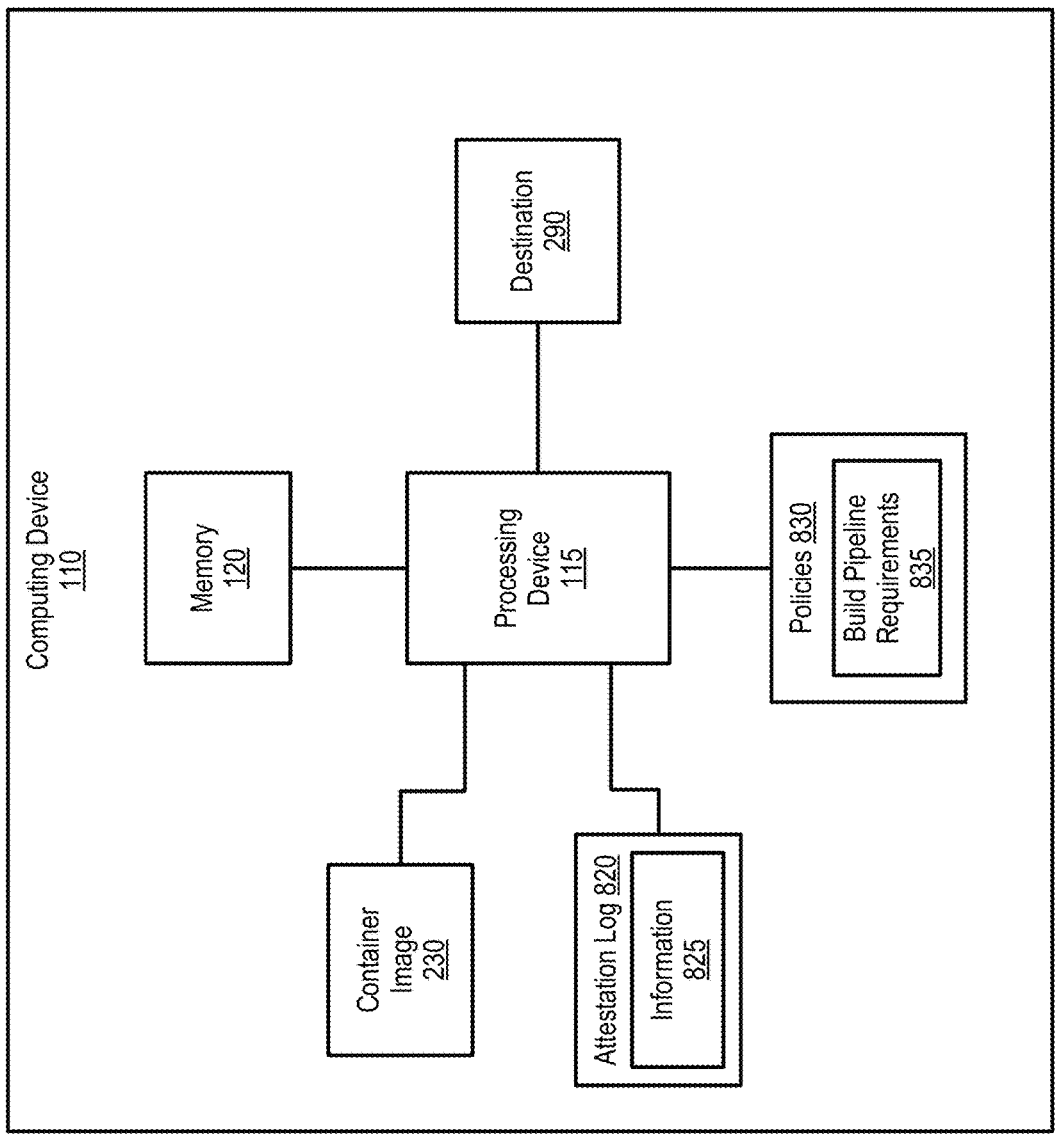
FIG. 8 is a block diagram that illustrates an example system for releasing a container image based on evaluating information describing the build pipeline utilized to create the container image, in accordance with some embodiments of the present disclosure.

FIG. 8 is a block diagram that illustrates an example system for releasing a container image based on evaluating information describing the build pipeline utilized to create the container image, in accordance with some embodiments of the present disclosure. System 800 shows computing device 110, which includes processing device 115 coupled to memory 120. Processing device 115 receives container image 230 and attestation log 820. Container image 230 is built from untrusted build pipeline 205 and attestation log 820 includes information 825 corresponding to tasks 210 utilized by untrusted build pipeline 205 to build container image 230.

Processing device 115 compares information 825 in attestation log 820 with policies 830 that include build pipeline requirements 835. Processing device 115, in turn, releases container image 230 to destination 290 based on the comparison indicating that the tasks 210 utilized by untrusted build pipeline 205 to build container image 230 meet build pipeline requirements 835. In some embodiments, destination 290 is external to computing device 110, such as a repository on a distributed computer system.

Figure 9:
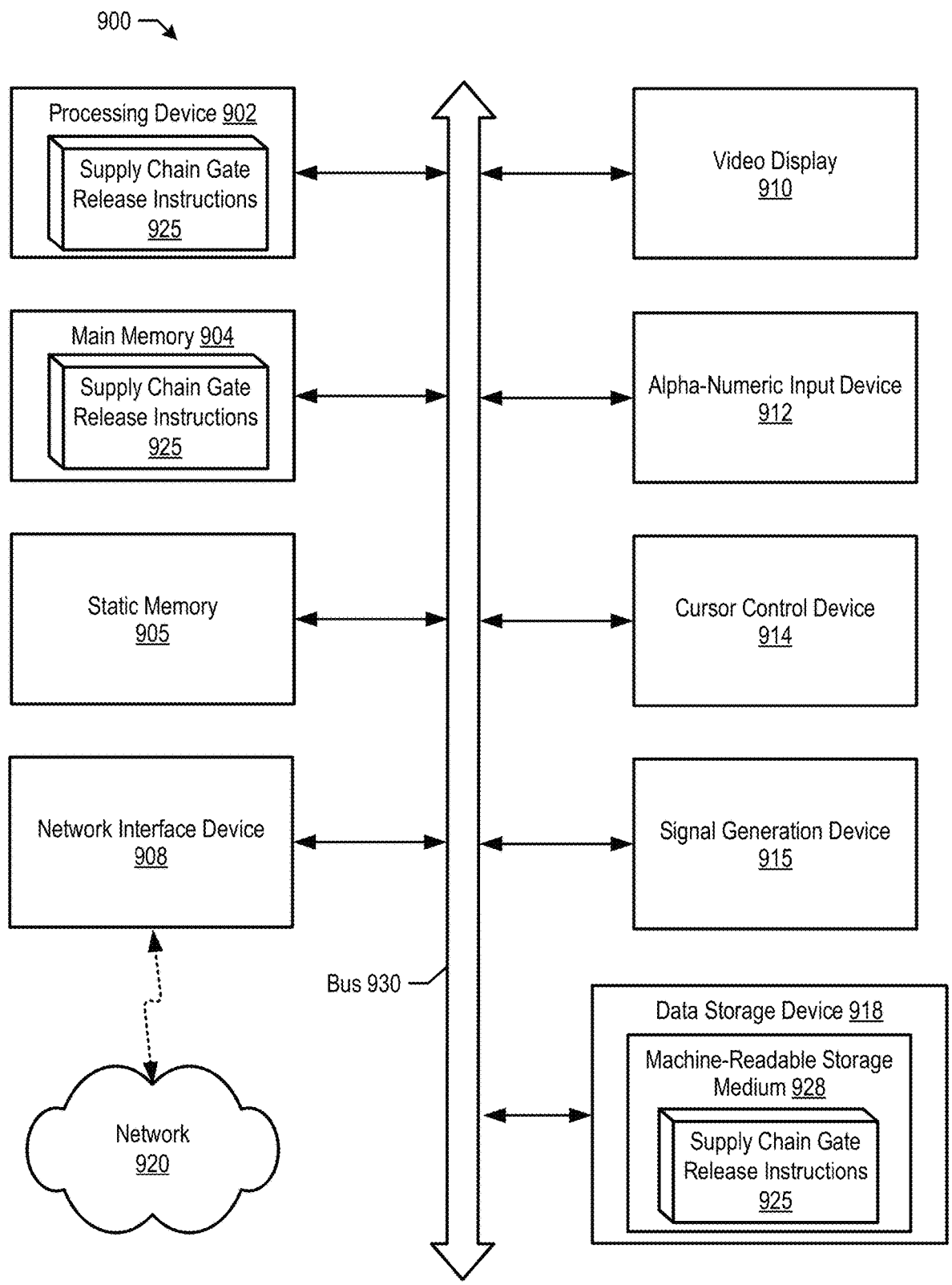
FIG. 9 is a block diagram of an example computing device that may perform one or more of the operations described herein, in accordance with some embodiments of the present disclosure.

FIG. 9 illustrates a diagrammatic representation of a machine in the example form of a computer system 900 within which a set of instructions, for causing the machine to perform any one or more of the methodologies discussed herein for intelligently scheduling containers, in accordance with some embodiments of the present disclosure.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 900 may be representative of a server.

The exemplary computer system 900 includes a processing device 902, a main memory 904 (e.g., read-only memory (ROM), flash memory, dynamic random access memory (DRAM), a static memory 906 (e.g., flash memory, static random access memory (SRAM), etc.), and a data storage device 918 which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In some embodiments, video display unit 910, alphanumeric input device 912, and cursor control device 914 may be combined into a single component or device (e.g., an LCD touch screen).

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute supply chain gate release instructions 925, for performing the operations and steps discussed herein.

The data storage device 918 may include a machine-readable storage medium 928, on which is stored one or more sets of supply chain gate release instructions 925 (e.g., software) embodying any one or more of the methodologies of functions described herein. The supply chain gate release instructions 925 may also reside, completely or at least partially, within the main memory 904 or within the processing device 902 during execution thereof by the computer system 900; the main memory 904 and the processing device 902 also constituting machine-readable storage media. The supply chain gate release instructions 925 may further be transmitted or received over a network 920 via the network interface device 908.

The machine-readable storage medium 928 may also be used to store instructions to perform a method for intelligently scheduling containers, as described herein. While the machine-readable storage medium 928 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Example 1 is a method comprising: receiving a container image and an attestation log, wherein the container image is built from a build pipeline and the attestation log comprises information corresponding to a plurality of tasks utilized by the build pipeline to build the container image; comparing, by a processing device, the information in the attestation log with policies comprising build pipeline requirements; and releasing the container image to a destination based on the comparing indicating that the plurality of tasks utilized by the build pipeline to build the container image meet the build pipeline requirements.

Example 2 is the method of Example 1, wherein the policies comprise task digests, the method further comprising: verifying that the information in the attestation log matches the task digests in the policies; and releasing the container image based on the verification.

Example 3 is the method of any of Examples 1-2, wherein the policies comprise task definitions and a task signature, the method further comprising: verifying that the information in the attestation log matches the task definitions and the task signature in the policies; and releasing the container image based on the verification.

Example 4 is the method of any of Examples 1-3, wherein the container image is a first container image and the attestation log is a first attestation log, the method further comprising: responsive to determining that at least one of the build pipeline requirements are not met, generating feedback that identifies the at least one of the build pipeline requirements; providing the feedback corresponding to the build pipeline; responsive to providing the feedback, receiving a second container image and a second attestation log; determining that the second attestation log indicates that the second container image meets the build pipeline requirements; and releasing the second container image responsive to determining that the second container image meets the build pipeline requirements.

Example 5 is the method of any of Examples 1-4, wherein the build pipeline is an unlocked build pipeline and customizable by a user device.

Example 6 is the method of any of Examples 1-5, further comprising: generating the attestation log based on observing the build pipeline building the container image, wherein the attestation log is unmodifiable by the user device.

Example 7 is the method of any of Examples 1-6, further comprising: prohibiting release of the container image responsive to determining that the attestation log is signed with an invalid key.

Example 8 is a system comprising: a memory; and a processing device operatively coupled to the memory, the processing device to: receive a container image and an attestation log, wherein the container image is built from a build pipeline and the attestation log comprises information corresponding to a plurality of tasks utilized by the build pipeline to build the container image; compare the information in the attestation log with policies comprising build pipeline requirements; and release the container image to a destination based on the comparison indicating that the plurality of tasks utilized by the build pipeline to build the container image meet the build pipeline requirements.

Example 9 is the system of Example 8, wherein the policies comprise task digests, and wherein the processing device is to: verify that the information in the attestation log matches the task digests in the policies; and release the container image based on the verification.

Example 10 is the system of any of Examples 8-9, wherein the policies comprise task definitions and a task signature, and wherein the processing device is to: verify that the information in the attestation log matches the task definitions and the task signature in the policies; and release the container image based on the verification.

Example 11 is the system of any of Examples 8-10, wherein the container image is a first container image and the attestation log is a first attestation log, and wherein the processing device is to: responsive to determine that at least one of the build pipeline requirements are not met, generate feedback that identifies the at least one of the build pipeline requirements; provide the feedback corresponding to the build pipeline; responsive to provide the feedback, receive a second container image and a second attestation log; determine that the second attestation log indicates that the second container image meets the build pipeline requirements; and release the second container image responsive to determine that the second container image meets the build pipeline requirements.

Example 12 is the system of any of Examples 8-11, wherein the build pipeline is an unlocked build pipeline and customizable by a user device.

Example 13 is the system of any of Examples 8-12, wherein the processing device is to: generate the attestation log based on observing the build pipeline building the container image, wherein the attestation log is unmodifiable by the user device.

Example 14 is the system of any of Examples 8-13, wherein the processing device is to: prohibit release of the container image responsive to determine that the attestation log is signed with an invalid key.

Example 15 is a non-transitory computer readable medium, having instructions stored thereon which, when executed by a processing device, cause the processing device to: receive a container image and an attestation log, wherein the container image is built from a build pipeline and the attestation log comprises information corresponding to a plurality of tasks utilized by the build pipeline to build the container image; compare the information in the attestation log with policies comprising build pipeline requirements; and release the container image to a destination based on the comparison indicating that the plurality of tasks utilized by the build pipeline to build the container image meet the build pipeline requirements.

Example 16 is the non-transitory computer readable medium of Example 15, wherein the policies comprise task digests, and wherein the processing device is to: verify that the information in the attestation log matches the task digests in the policies; and release the container image based on the verification.

Example 17 is the non-transitory computer readable medium of any of Examples 15-16, wherein the policies comprise task definitions and a task signature, and wherein the processing device is to: verify that the information in the attestation log matches the task definitions and the task signature in the policies; and release the container image based on the verification.

Example 18 is the non-transitory computer readable medium of any of Examples 15-17, wherein the container image is a first container image and the attestation log is a first attestation log, and wherein the processing device is to: responsive to determine that at least one of the build pipeline requirements are not met, generate feedback that identifies the at least one of the build pipeline requirements; provide the feedback corresponding to the build pipeline; responsive to provide the feedback, receive a second container image and a second attestation log; determine that the second attestation log indicates that the second container image meets the build pipeline requirements; and release the second container image responsive to determine that the second container image meets the build pipeline requirements.

Example 19 is the non-transitory computer readable medium of any of Examples 15-18, wherein the build pipeline is an unlocked build pipeline and customizable by a user device.

Example 20 is the non-transitory computer readable medium of any of Examples 15-19, wherein the processing device is to: generate the attestation log based on observing the build pipeline building the container image, wherein the attestation log is unmodifiable by the user device.

Example 21 s the non-transitory computer readable medium of any of Examples 15-20, wherein the processing device is to: prohibit release of the container image responsive to determine that the attestation log is signed with an invalid key.

Example 22 is a method comprising: building a container image using a build pipeline comprising a plurality of tasks; collecting information, during the building of the container image, corresponding to the plurality of tasks; generating an attestation log based on the collected information; sending the container image and the attestation log to a release pipeline; and receiving verification results from the release pipeline that the container image meets build requirements to release the container image.

Example 23 is the method of Example 22, wherein the verification results indicate that the container image fails to meet at least one of the build requirements, the method further comprising: determining at least one new task to fulfill the at least one failed build requirements; adding the at least one new task to the build pipeline to produce a modified build pipeline; building another container image using the modified build pipeline; collecting information, during the building of the container image, corresponding to the plurality of tasks; generating another attestation log based on information collected while building the other container image using the modified build pipeline; sending the other container image and the other attestation log to the release pipeline; and receiving verification results from the release pipeline that the other container image meets the build requirements to release the container image to a destination.

Example 24 is the method of any of Examples 22-23, further comprising: receiving an allowed task digest list corresponding to the build requirements; and determining which of the plurality of tasks to load into the build pipeline based on the allowed task digest list.

Example 25 is the method of any of Examples 22-24, further comprising: receiving a plurality of signed task definitions corresponding to the build requirements, wherein the plurality of signed task definitions comprise a plurality of signatures; loading the plurality of signatures as a plurality of annotations into the plurality of tasks; and adding the plurality of annotations to the collected information.

Example 26 is the method of any of Examples 22-25, further comprising: signing the attestation log with an attestation key; and sending the attestation log to the release pipeline.

Example 27 is the method of any of Examples 22-26, wherein the attestation log is unmodifiable by a user device.

Example 28 is the method of any of Examples 22-27, wherein the build pipeline is customizable by a user device.

Example 29 is a system comprising: a memory; and a processing device operatively coupled to the memory, the processing device to: build a container image using a build pipeline comprising a plurality of tasks; collect information, during the building of the container image, corresponding to the plurality of tasks; generate an attestation log based on the collected information; send the container image and the attestation log to a release pipeline; and receive verification results from the release pipeline that the container image meets build requirements to release the container image.

Example 30 is the system of Example 29, wherein the verification results indicate that the container image fails to meet at least one of the build requirements, and wherein the processing device is to: determine at least one new task to fulfill the at least one failed build requirements; add the at least one new task to the build pipeline to produce a modified build pipeline; build another container image using the modified build pipeline; collect information, during the build of the container image, corresponding to the plurality of tasks; generate another attestation log based on information collected during the build of the other container image using the modified build pipeline; send the other container image and the other attestation log to the release pipeline; and receive verification results from the release pipeline that the other container image meets the build requirements to release the container image to a destination.

Example 31 is the system of any of Examples 29-30, wherein the processing device is to: receive an allowed task digest list corresponding to the build requirements; and determine which of the plurality of tasks to load into the build pipeline based on the allowed task digest list.

Example 32 is the system of any of Examples 29-31, wherein the processing device is to: receive a plurality of signed task definitions corresponding to the build requirements, wherein the plurality of signed task definitions comprise a plurality of signatures; load the plurality of signatures as a plurality of annotations into the plurality of tasks; and add the plurality of annotations to the collected information.

Example 33 is the system of any of Examples 29-32, wherein the processing device is to: sign the attestation log with an attestation key; and send the attestation log to the release pipeline.

Example 34 is the system of any of Examples 29-33, wherein the attestation log is unmodifiable by a user device.

Example 35 is the system of any of Examples 29-34, wherein the build pipeline is customizable by a user device.

Example 36 is a non-transitory computer readable medium, having instructions stored thereon which, when executed by a processing device, cause the processing device to: build a container image using a build pipeline comprising a plurality of tasks; collect information, during the building of the container image, corresponding to the plurality of tasks; generate an attestation log based on the collected information; send the container image and the attestation log to a release pipeline; and receive verification results from the release pipeline that the container image meets build requirements to release the container image to a destination.

Example 37 is the non-transitory computer readable medium of any of Example 36, wherein the verification results indicate that the container image fails to meet at least one of the build requirements, and wherein the processing device is to: determine at least one new task to fulfill the at least one failed build requirements; add the at least one new task to the build pipeline to produce a modified build pipeline; build another container image using the modified build pipeline; collect information, during the build of the container image, corresponding to the plurality of tasks; generate another attestation log based on information collected during the build of the other container image using the modified build pipeline; send the other container image and the other attestation log to the release pipeline; and receive verification results from the release pipeline that the other container image meets the build requirements to release the container image.

Example 38 is the non-transitory computer readable medium of any of Examples 36-37, wherein the processing device is to: receive an allowed task digest list corresponding to the build requirements; and determine which of the plurality of tasks to load into the build pipeline based on the allowed task digest list.

Example 39 is the non-transitory computer readable medium of any of Examples 36-38, wherein the processing device is to: receive a plurality of signed task definitions corresponding to the build requirements, wherein the plurality of signed task definitions comprise a plurality of signatures; load the plurality of signatures as a plurality of annotations into the plurality of tasks; and add the plurality of annotations to the collected information.

Example 40 is the non-transitory computer readable medium of any of Examples 36-39, wherein the processing device is to: sign the attestation log with an attestation key; and send the attestation log to the release pipeline.

Example 41 is the non-transitory computer readable medium of any of Examples 36-40, wherein the attestation log is unmodifiable by a user device.

Example 42 is the non-transitory computer readable medium of any of Examples 36-41, wherein the build pipeline is customizable by a user device.

Example 43 is an apparatus comprising: means for receiving a container image and an attestation log, wherein the container image is built from a build pipeline and the attestation log comprises information corresponding to a plurality of tasks utilized by the build pipeline to build the container image; means for comparing, by a processing device, the information in the attestation log with policies comprising build pipeline requirements; and means for releasing the container image to a destination based on the comparing indicating that the plurality of tasks utilized by the build pipeline to build the container image meet the build pipeline requirements.

Example 44 is the apparatus of Example 43, wherein the policies comprise task digests, the apparatus further comprising: means for verifying that the information in the attestation log matches the task digests in the policies; and means for releasing the container image based on the verification.

Example 45 is the apparatus of any of Examples 43-44, wherein the policies comprise task definitions and a task signature, the apparatus further comprising: means for verifying that the information in the attestation log matches the task definitions and the task signature in the policies; and means for releasing the container image based on the verification.

Example 46 is the apparatus of any of Examples 43-45, wherein the container image is a first container image and the attestation log is a first attestation log, the apparatus further comprising: means for determining that at least one of the build pipeline requirements are not met; means for generating feedback that identifies the at least one of the build pipeline requirements; means for providing the feedback corresponding to the build pipeline; means for receiving a second container image and a second attestation log; means for determining that the second attestation log indicates that the second container image meets the build pipeline requirements; and means for releasing the second container image responsive to determining that the second container image meets the build pipeline requirements.

Example 47 is the apparatus of any of Examples 43-46, wherein the build pipeline is an unlocked build pipeline and customizable by a user device.

Example 48 is the apparatus of any of Examples 43-47, wherein the apparatus further comprises: means for generating the attestation log based on observing the build pipeline building the container image, wherein the attestation log is unmodifiable by the user device.

Example 49 is the apparatus of any of Examples 43-48, wherein the apparatus further comprises: means for prohibiting release of the container image responsive to determining that the attestation log is signed with an invalid key.

Unless specifically stated otherwise, terms such as "receiving," "comparing," "releasing," "verifying," "determining," "providing," "generating," "prohibiting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the embodiments of the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the embodiments of the present disclosure are not to be limited to the details given herein, but may be modified within the scope and equivalents of the appended claims.

What is claimed is:

1. A method comprising:
  receiving a container image and an attestation log, wherein the container image is built from a build pipeline and the attestation log comprises information corresponding to a plurality of tasks utilized by the build pipeline to build the container image;
  comparing, by a processing device, the information in the attestation log with policies comprising build pipeline requirements; and
  releasing the container image to a destination based on the comparing indicating that the plurality of tasks utilized by the build pipeline to build the container image meet the build pipeline requirements.

2. The method of claim 1, wherein the policies comprise task digests, the method further comprising:
  verifying that the information in the attestation log matches the task digests in the policies; and
  releasing the container image based on the verification.

3. The method of claim 1, wherein the policies comprise task definitions and a task signature, the method further comprising:
  verifying that the information in the attestation log matches the task definitions and the task signature in the policies; and
  releasing the container image based on the verification.

4. The method of claim 1, wherein the container image is a first container image and the attestation log is a first attestation log, the method further comprising:
  responsive to determining that at least one of the build pipeline requirements are not met, generating feedback that identifies the at least one of the build pipeline requirements;
  providing the feedback corresponding to the build pipeline;
  responsive to providing the feedback, receiving a second container image and a second attestation log;
  determining that the second attestation log indicates that the second container image meets the build pipeline requirements; and
  releasing the second container image responsive to determining that the second container image meets the build pipeline requirements.

5. The method of claim 1, wherein the build pipeline is an unlocked build pipeline and customizable by a user device.

6. The method of claim 5, further comprising:
  generating the attestation log based on observing the build pipeline building the container image, wherein the attestation log is unmodifiable by the user device.

7. The method of claim 1, further comprising:
  prohibiting release of the container image responsive to determining that the attestation log is signed with an invalid key.

8. A system comprising:
  a memory; and
  a processing device operatively coupled to the memory, the processing device to:
    receive a container image and an attestation log, wherein the container image is built from a build pipeline and the attestation log comprises information corresponding to a plurality of tasks utilized by the build pipeline to build the container image;
    compare the information in the attestation log with policies comprising build pipeline requirements; and
    release the container image to a destination based on the comparison indicating that the plurality of tasks utilized by the build pipeline to build the container image meet the build pipeline requirements.

9. The system of claim 8, wherein the policies comprise task digests, and wherein the processing device is to:
  verify that the information in the attestation log matches the task digests in the policies; and
  release the container image based on the verification.

10. The system of claim 8, wherein the policies comprise task definitions and a task signature, and wherein the processing device is to:
  verify that the information in the attestation log matches the task definitions and the task signature in the policies; and
  release the container image based on the verification.

11. The system of claim 8, wherein the container image is a first container image and the attestation log is a first attestation log, and wherein the processing device is to:
responsive to determining that at least one of the build pipeline requirements are not met, generate feedback that identifies the at least one of the build pipeline requirements;
provide the feedback corresponding to the build pipeline;
responsive to providing the feedback, receive a second container image and a second attestation log;
determine that the second attestation log indicates that the second container image meets the build pipeline requirements; and
release the second container image responsive to determining that the second container image meets the build pipeline requirements.

12. The system of claim 8, wherein the build pipeline is an unlocked build pipeline and customizable by a user device.

13. The system of claim 12, wherein the processing device is to:
generate the attestation log based on observing the build pipeline building the container image, wherein the attestation log is unmodifiable by the user device.

14. The system of claim 8, wherein the processing device is to:
prohibit release of the container image responsive to determining that the attestation log is signed with an invalid key.

15. A non-transitory computer readable medium, having instructions stored thereon which, when executed by a processing device, cause the processing device to:
receive a container image and an attestation log, wherein the container image is built from a build pipeline and the attestation log comprises information corresponding to a plurality of tasks utilized by the build pipeline to build the container image;
compare, by the processing device, the information in the attestation log with policies comprising build pipeline requirements; and
release the container image to a destination based on the comparison indicating that the plurality of tasks utilized by the build pipeline to build the container image meet the build pipeline requirements.

16. The non-transitory computer readable medium of claim 15, wherein the policies comprise task digests, and wherein the processing device is to:
verify that the information in the attestation log matches the task digests in the policies; and
release the container image based on the verification.

17. The non-transitory computer readable medium of claim 15, wherein the policies comprise task definitions and a task signature, and wherein the processing device is to:
verify that the information in the attestation log matches the task definitions and the task signature in the policies; and
release the container image based on the verification.

18. The non-transitory computer readable medium of claim 15, wherein the container image is a first container image and the attestation log is a first attestation log, and wherein the processing device is to:
responsive to determining that at least one of the build pipeline requirements are not met, generate feedback that identifies the at least one of the build pipeline requirements;
provide the feedback corresponding to the build pipeline;
responsive to providing the feedback, receive a second container image and a second attestation log;
determine that the second attestation log indicates that the second container image meets the build pipeline requirements; and
release the second container image responsive to determining that the second container image meets the build pipeline requirements.

19. The non-transitory computer readable medium of claim 15, wherein the build pipeline is an unlocked build pipeline and customizable by a user device.

20. The non-transitory computer readable medium of claim 18, wherein the processing device is to:
generate the attestation log based on observing the build pipeline building the container image, wherein the attestation log is unmodifiable by the user device.

* * * * *